Patented Jan. 28, 1936

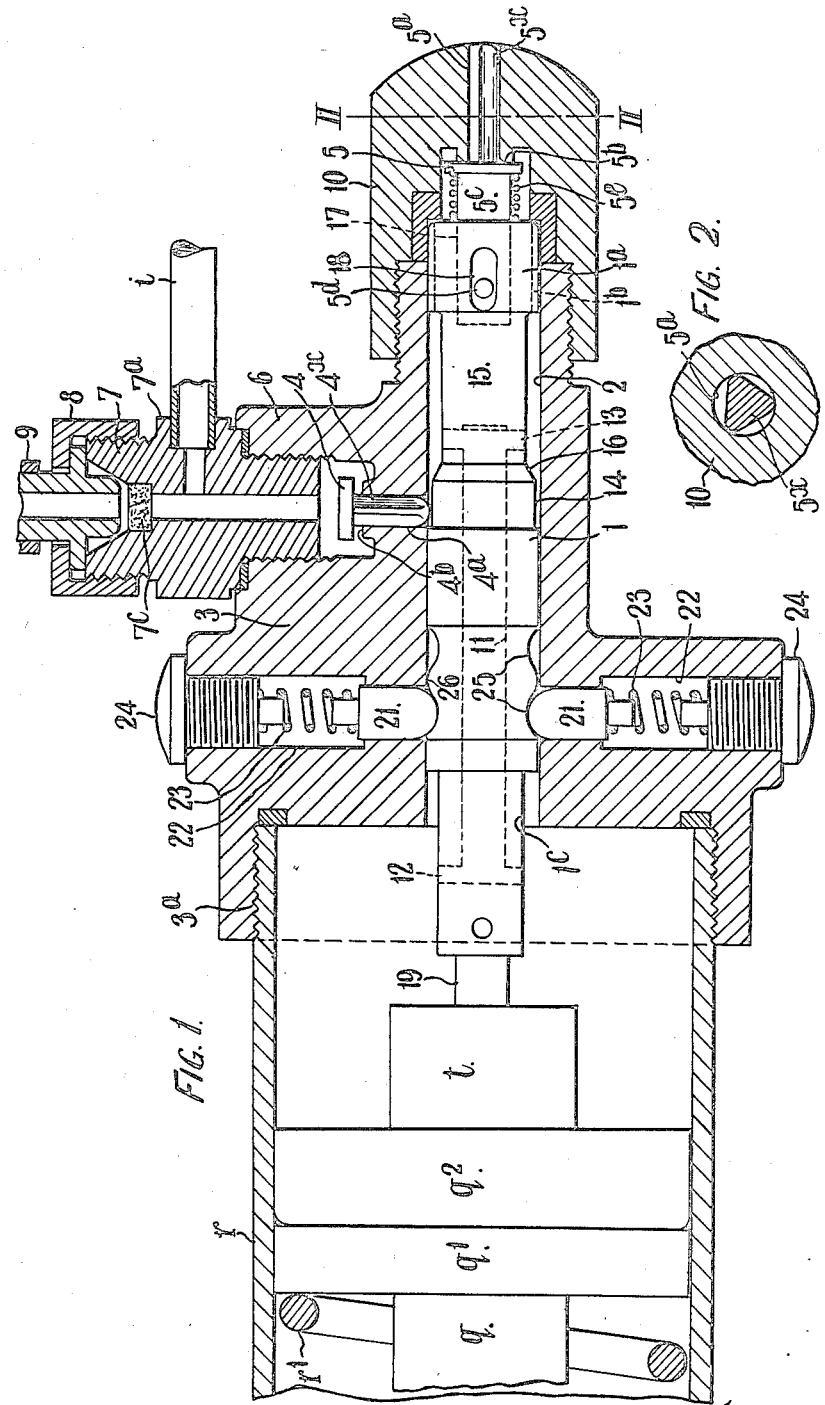

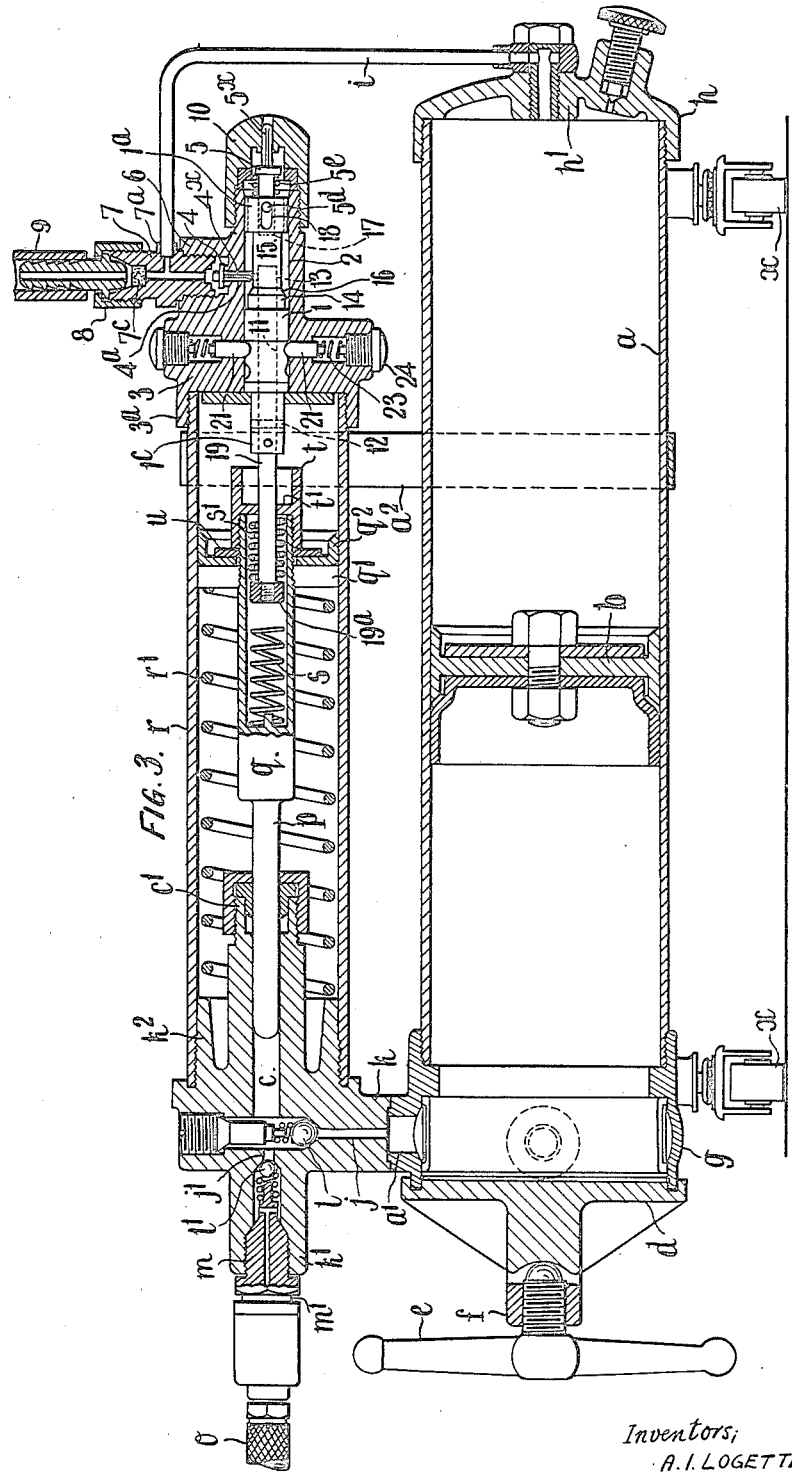

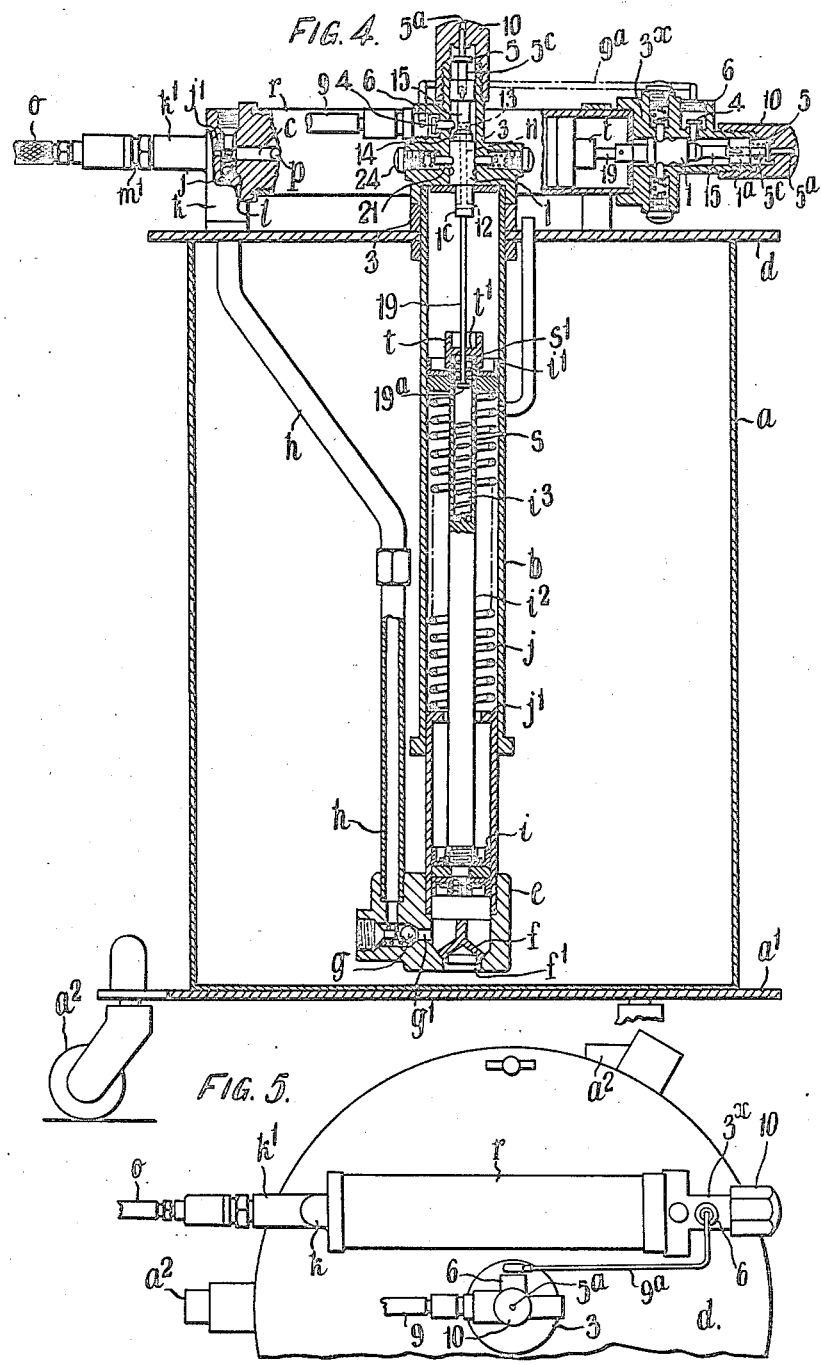

2,028,938

UNITED STATES PATENT OFFICE 2,028,938

AUTOMATIC VALVE

Abraham Isaac Logette and Edgar Harry Dainton, London, England

Application September 5, 1934, Serial No. 742,778
In Great Britain September 2, 1933

2 Claims. (Cl. 121—164)

This invention relates to valves, and more particularly to automatic air inlet and exhaust valves for use with air motors, air pumps, hydraulic lifts and other apparatus connected with compressed air power lines, such for example as power operated greasing and lubricating apparatus and has for its object to simplify and improve the construction and design of such valves so as to increase the durability, efficiency and reliability thereof.

Automatic air inlet and exhaust valves of the kind referred to as heretofore constructed comprise a tubular slide or plunger furnished with inlet and outlet ports which is mounted so as to work air tight in the bore of the casing and is intermittently operated by the machine or apparatus through compression-springs or other devices so that the slide or plunger is rapidly moved against the resistance of spring detents to bring the inlet and outlet ports therein alternately into register with the air inlet and exhaust ports in the valve casing so that the compressed air is admitted and exhausted through the tubular piston or plunger.

The piston or plunger has to be very accurately fitted in its valve casing and is liable to seize or become damaged owing to unequal contraction and condensation caused by the expansion of the exhaust air or like motive fluid.

According to the present invention the piston or plunger of an automatic air inlet and exhaust valve of the kind referred to is arranged in operable combination with independent air inlet and exhaust valves so that compressed air or like motive fluid—admitted through the inlet valve to the valve casing is delivered to the machine or apparatus to be controlled through the tubular piston or plunger, the exhaust air being also returned through such piston or plunger to the valve casing from which it escapes by the independent exhaust valve controlled by such piston or plunger.

The piston or plunger together with the air inlet and exhaust valves are mounted in a casing that comprises a bore having suitably arranged inlet and exhaust ports, the piston or plunger working in the bore of the casing and being adapted to co-operate with the inlet and exhaust valves which respectively control the inlet and exhaust ports so that as the piston or plunger reciprocates in the casing the inlet valve is closed while the exhaust valve is opened, and vice-versa.

The invention is further described with reference to the accompanying drawings, wherein similar references indicate like parts.

Fig. 1 is a fragmental longitudinal sectional view illustrating one construction of automatic air inlet and exhaust valve in accordance with the present invention; Fig. 2 a cross section on the line II—II Fig. 1; Figs. 3 and 4 are respectively longitudinal sectional views on a smaller scale illustrating applications of the automatic air valve shown at Fig. 1, while Fig. 5 is a fragmental plan view of Fig. 4.

As shown in the drawings, the piston or plunger 1 is mounted in the bore 2 of the valve casing 3 so as to cooperate with an independent inlet valve 4 and exhaust valve 5 which respectively control an inlet port 4a and exhaust port 5a of the bore 2.

The inlet port 4a is disposed laterally of the bore 2 and communicates with a tubular boss 6 which is connected through a perforated screw plug 7 and a flanged coupling sleeve 8 to a flexible pipe line 9 leading to a source of compressed air, while the exhaust port 5a is comprised in a perforated cap 10 which screws on to the end of the valve casing 3 and forms the terminal of the bore 2 thereof.

The inlet and exhaust valves 4 and 5 each comprise a spindle of triangular cross section, (see Fig. 3) at one end of which the valve head is mounted, such valves being respectively mounted in the inlet port 4a and exhaust port 5a so that the head of each valve can seat airtight on the valve seating formed about one end of each port.

The inlet valve 4 is mounted in the inlet port 4a so that the head of the valve seats airtight upon a seating 4b formed about the inner end of the inlet port, while the stem 4x of the valve projects through such port into the bore 2 of the valve casing. The exhaust valve 5 is mounted in the exhaust port 5a so that the head of the valve seats airtight on the seating 5b formed about the inner end of the exhaust port, through which latter the triangular valve spindle 5x works, while the head of the exhaust valve 5 is furnished with a cylindrical pin or extension 5c that projects into the bore 2 of the valve casing.

The piston or plunger 1 is made of reduced external diameter intermediate its ends and has a bore 11 formed through part of its length that communicates at each end with ports 12 and 13. The intermediate portion of the piston or plunger comprises a slightly reduced section 14 and an adjacent section 15 which is appreciably stepped down, the shoulder 16 between such sections being adapted to form a cam for operating the air inlet valve 4 as presently described, while the ports 13 at one end of the bore 11 in the piston or plunger are formed in the step-down intermediate section 15.

The inner end 1a of the piston or plunger 1 has longitudinal grooves 1b formed in the exterior thereof and has formed therein a central recess 17 with which the pin or extension 5c of the exhaust valve 5 makes a sliding fit; the movement of the pin or extension 5c in such recesses is limited by a cross pin 5d which works in lateral slots 18 formed in the end 1a of the piston or plunger, while a coiled spring 5e is mounted on the extension 5c between the head of the exhaust valve 5 and the inner end 1a of the piston or plunger.

The outer end 1c of the piston or plunger is reduced and has one end of the piston rod 19 secured therein while the ports 12 of the bore 11 of the piston or plunger are formed in the reduced outer end 1c thereof. The valve casing 3 is furnished as usual with oppositely disposed plungers 21 which are mounted in radial bores 22 in the valve casing and are controlled by springs 23 secured in the bores by screw plugs 24 so that the inner ends of such plugs project into the bore 2 and engage one or other of a pair of annular grooves 25 formed on the exterior of the piston or plunger 1, the grooves being separated from each other by the cam shaped annular hump 26.

Such spring controlled plungers serve to control the slide or plunger 1 in the inlet and exhaust positions until the pressure on the piston or plunger is sufficient to overcome the resistance thereof.

As the piston or plunger is moved from the exhaust position shown at Fig. 3 to the inlet position shown at Fig. 1, the cam 16 in the reduced portion thereof engages the stem of the inlet valve 4, thus opening such valve by raising the same from its seating 4a while the exhaust valve 5 is simultaneously closed by the re-action of the spring 5e carried on the pin or extension 5c thereof.

The inlet valve 4 is held open by the slightly reduced intermediate section 14 of the piston valve, so that compressed air is admitted through the inlet port 4 past the triangular stem of the raised inlet valve into the bore 2 of the plunger chamber from which it passes through the ports 13 to the bore 11 of the piston or plunger from which it is delivered via the ports 13 in the reduced end 1c to the machine or apparatus on which the valve casing 3 is mounted.

As the piston or plunger is moved to the exhaust position shown in Fig. 2, the slightly reduced section 14 releases the spindle of the inlet valve 4 so that the latter is closed by the air pressure, while the exhaust valve 5 is simultaneously opened by the engagement of the slots 18 in the inner end 1a of the piston or plunger with the cross pin 5d on the extension 5c of the exhaust valve, so that air exhausted from the machine or apparatus via the piston or plunger 1, into the bore of the valve chamber escapes therefrom via the slots 1b in the end 1a of the piston or plunger through the open exhaust valve 5, the cycle being repeated during the operation of the machine or apparatus.

Applications of the improved automatic air valve to power operated apparatus of known kind are illustrated at Fig. 3 and at Figs. 4 and 5 respectively.

The apparatus illustrated at Fig. 3 comprises a closed cylindrical grease container $a$ in which a plunger or follower $b$ works grease tight, one end of the container being connected to the compressed air supply pipe 9 to which the valve chamber 3 is connected, while its other end is connected through an outlet nozzle $a'$ to a high pressure delivery chamber $c$.

The end of the container adjacent to its delivery nozzle $a'$ is closed by means of a removable filling cap $d$ which is secured grease tight by means of the hand screw $e$ mounted in the yoke $f$ pivoted at $g$ to the container, while the other end of the container is closed by a cap $h$ furnished with an inlet nozzle $h'$ in which one end of an air pipe $i$ is secured, the other end of such pipe being secured in a nozzle $7a$ of the perforated screw plug 7 through which the valve chamber 3 is connected to the air supply pipe 9.

When the container $a$ is charged with grease the plunger or follower $b$ therein is pushed towards the end closed by the compressed air inlet cap $h$ so that compressed air enters the container $a$ behind the piston or follower $b$ which latter is thus driven forward in order to force the grease from the container through its outlet nozzle $a'$.

The high pressure delivery chamber $c$ together with its inlet and outlet passages $j$ and $j'$ are formed in a casting $k$ which comprises an outlet nozzle $k'$ and an externally threaded boss $k^2$.

The inlet and outlet passages $j$ and $j'$ of the delivery chamber $c$ are controlled as usual by spring controlled non-return valves $l$ and $l'$ so that grease under pressure can be forced past the inlet valve $l$ into the delivery chamber $c$ from which it is ejected under considerably higher pressure by means of a ram plunger $p$ past the outlet valve $l'$ to the outlet nozzle $k'$, which latter is connected by a perforated nipple $m$ and coupling $m'$ to a flexible delivery hose $o$.

The plunger $p$ works grease tight through a gland and stuffing box $c'$ arranged on the free end of the delivery chamber $c$ and makes a sliding fit with the bore of the latter. Such plunger $p$ is furnished with an enlarged tubular extension $q$ on which is secured a plunger $q'$ furnished with a cup leather $q^2$ which is adapted to reciprocate air tight in a tubular casing $r$ against the resistance of a spring $r'$ arranged in such casing.

The casing $r$ is supported on the container $a$ by a strap $a^2$, one end thereof being screwed on to an externally threaded boss $k^2$ of the casting $k$ while its other end is externally screw threaded so as to engage an internally threaded socket $3a$ on the valve casing 3. The valve casing 3 is thus secured on the end of the tubular casing $r$ with its piston or plunger 1 in alignment with the plunger $p$ of the high pressure delivery chamber $c$ so that the piston rod 19 of the piston or plunger projects into the tubular extension $q$ of the plunger $p'$. The piston rod 19 is furnished with a head 19a, while two coiled springs $s$ and $s'$ are housed in the tubular extension $q$ on opposite sides of the head 19a of the piston rod 19 of the slide or piston valve.

The abutment for one end of the spring $s'$ is formed by an internal flange $t'$ of a tubular extension $t$ that is screwed on to the free end of the tubular extension $q$ and serves to clamp a washer $u$ against the cup leather $q^2$ and hold the latter in position against the plunger $q'$ while the abutment for one end of the spring $s$ is formed by the closed end of the tubular extension $q$. When the grease is forced under pressure from the chamber $a$ past the inlet valve $l$ into the high pressure chamber $c$ it forces back the plunger $p$ together with its tubular extension $q$ so that the spring $s$ in the latter is compressed against the head 19a of the piston rod 19, until the compression of the spring $s$ is sufficient to overcome the resistance of the spring controlled plungers 21 and force back the piston or plunger 1 into the air inlet position shown at Fig. 1.

The compressed air then passes through the bore 11 of the piston or plunger 1 into the tubular casing $r$ behind the cup leather $q^2$ of the plunger $q'$ and thus forces back the extension $q$ and plunger $p$ against the pressure of the spring $r$, so ejecting grease from the chamber $c$ under high pressure against the resistance in the outlet nozzle $k'$ from which it is delivered as usual through the perforated nipple $m$ connected by the coupling $m'$ to a high pressure delivery hose $o$.

As the tubular extension $q$ is forced back by the air pressure the spring $s$ is released, while the spring $s'$ is compressed against the outer side of the head $19a$ on the piston $19$ until the pressure on this spring is sufficient to overcome the resistance of the spring-controlled plunger $21$ and return the piston or plunger $1$ to the exhaust position shown at Fig. 3, the cycle of operations being repeated during the user of the lubricating apparatus.

As shown in the drawings, the plug $7$ of the valve casing $3$ is furnished with a filter $7c$ through which the compressed air passes before it reaches the inlet valve $4$, while the container $a$ is mounted upon castors $x$ so as to render the lubricating apparatus more easily portable.

The apparatus illustrated at Figs. 4 and 5 comprises a single acting compressed air pump arranged in combination with a high pressure delivery chamber to form a lubricating apparatus adapted for use with a grease keg or like container from which the pump delivers grease under pressure to the high pressure delivery chamber.

As shown, the high pressure delivery chamber $c$ together with the pump comprising a barrel $b$ are mounted upon a base $d$ adapted to cover and rest upon the open end of a grease keg or the like $a$ so that the pump barrel $b$ extends into the lower part of the keg, the high pressure delivery chamber $c$ together with its associated automatic operating mechanism being mounted horizontally upon the base $d$, while the grease keg is mounted upon a platform $a'$ furnished with castors $a^2$ to facilitate transport.

The upper end of the pump barrel $b$ is secured in the base $d$ and is closed by the housing $3$ of the automatic inlet and exhaust valve, while the lower end of such barrel is furnished with a casing $e$ in which are housed a suction inlet valve $f$ which controls an inlet port $f'$ and a spring controlled delivery valve $g$ that controls an outlet port $g'$ which leads to a delivery pipe $h$ through which the pump barrel is connected to the high pressure delivery chamber $c$ contained in the casting $k$.

The pump barrel is furnished with two pistons $i$—$i'$ which are connected together by a piston rod $i^2$ and work grease and air tight in the pump barrel, a coiled spring $j$ being arranged between the upper piston $i'$ and an annular abutment $j'$ in the lower part of the pump barrel, while the upper end of the piston rod $i^2$ is bored out as indicated at $i^3$.

The valve casing $3$ is secured on the upper end of the pump barrel $b$ with its piston or plunger $1$ in alignment with the piston rod $i^2$ of the pump so that the rod $19$ of the piston or plunger together with the head $19a$ extends into the tubular end $i^3$ of the pump piston rod.

Two coiled springs $s$—$s'$ are housed in the tubular end $i^3$ of the pump piston rod on opposite sides of the head $19a$ of the air valve rod $19$, the abutment for one end of the spring $s'$ being formed by an internal flange $t'$ of the tubular extension $t$ which is screwed on to the tubular end of the pump piston rod $i^2$, while the abutment for one end of the spring $s$ is formed by the closed end of the tubular portion $i^3$ of the pump piston rod.

Compressed air is supplied to the housing $3$ of the automatic inlet and exhaust valve on the pump barrel $b$ and also to the housing $3x$ of the automatic inlet and exhaust valve arranged in connection with the high pressure delivery chamber $c$ as already described with reference to Fig. 3, through a flexible pipe line $9$. Such pipe line is directly coupled to the tubular boss $6$ of the pump air valve casing $3$, the inlet side of which is connected by a branch air supply pipe $9a$ to the inlet side of the air valve casing $3x$ through which the plunger of the high pressure delivery chamber $c$ is operated as described above with reference to Fig. 3.

The pump illustrated is operated by compressed air against the resistance of its spring $j$, the reaction of which effects the return stroke of the pump plungers $i$—$i'$.

As the pump operates the delivery stroke of the pump plunger $i$ forces grease from the pump barrel past the outlet valve $g$ through the delivery pipe $h$ to the high pressure delivery chamber $c$, so operating the plunger $p$ in the latter together with the piston or plunger of the automatic inlet and exhaust air valve connected therewith, as previously described.

On the delivery stroke of the pump the piston or plunger $1$ of the automatic air valve arranged in the air valve casing $3$ is moved into the exhaust position shown at Fig. 4 by the compression of the spring $s'$ against the head $19a$ of the valve rod $19$ in the upper part of the plunger $i^2$.

As the pump pistons are returned by the reaction of the spring $j$, the spring $s$ is compressed against the head $19a$ of the valve rod $19$, until the compression of such spring is sufficient to move the plunger or piston $1$ into the air inlet position against the resistance of its spring controlled detents $21$, while grease is drawn into the pump barrel $b$ past the non-return inlet valve $f$, the cycle of operations being repeated during the user of the apparatus.

What we claim is:—

1. Automatic valve and valve gear mechanism, for pneumatic motors of the reciprocating piston type, comprising a valve casing having a laterally disposed inlet valve, and, at one end, an exhaust valve, and a plunger formed with a longitudinal bore with ports at the ends thereof, said plunger being constructed and adapted, on its instroke, to open the inlet valve and close the exhaust valve, and on its outstroke to close the inlet valve and open the exhaust valve and to provide for the passage of the air through the bore of the casing during the inlet and exhaust operations, according to the direction of movement of the plunger.

2. An automatic air inlet and exhaust valve as claimed in claim 1 wherein the plunger is made of reduced diameter and furnished with a cam surface intermediate its ends so as to co-operate with a laterally disposed inlet valve and is connected at one end to a spring controlled exhaust valve.

ABRAHAM ISAAC LOGETTE.
EDGAR HARRY DAINTON.